United States Patent
Ritter

(10) Patent No.: US 7,420,465 B2
(45) Date of Patent: Sep. 2, 2008

(54) METHOD AND SYSTEM FOR FINDING LOST OR STOLEN OBJECTS

(75) Inventor: Rudolf Ritter, Zollikofen (CH)

(73) Assignee: Swisscom Mobile AG, Bern (CH)

( * ) Notice: Subject to any disclaimer, the term of this patent is extended or adjusted under 35 U.S.C. 154(b) by 172 days.

(21) Appl. No.: 11/212,792

(22) Filed: Aug. 26, 2005

(65) Prior Publication Data

US 2006/0055538 A1   Mar. 16, 2006

(30) Foreign Application Priority Data

Aug. 26, 2004   (EP)   ................................. 04104114

(51) Int. Cl.
*G08B 1/08*   (2006.01)
(52) U.S. Cl. ................. 340/539.32; 340/572.1
(58) Field of Classification Search ............ 340/539.32, 340/572.1
See application file for complete search history.

(56) References Cited

U.S. PATENT DOCUMENTS

| | | | |
|---|---|---|---|
| 6,169,483 B1* | 1/2001 | Ghaffari et al. | 340/572.3 |
| 6,259,367 B1* | 7/2001 | Klein | 340/572.1 |
| 6,609,656 B1* | 8/2003 | Elledge | 235/382 |
| 6,662,078 B1 | 12/2003 | Hardgrave | |
| 6,774,811 B2* | 8/2004 | Kaufman et al. | 340/825.49 |
| 6,897,778 B1* | 5/2005 | Borlenghi | 340/572.4 |
| 6,967,577 B2* | 11/2005 | Taylor et al. | 340/572.1 |
| 7,002,473 B2* | 2/2006 | Glick et al. | 340/572.1 |
| 7,034,684 B2* | 4/2006 | Boman et al. | 340/568.1 |
| 7,165,722 B2* | 1/2007 | Shafer et al. | 235/385 |
| 7,183,925 B2* | 2/2007 | Marshall et al. | 340/572.4 |
| 2002/0014955 A1* | 2/2002 | Klitsgaard | 340/10.42 |
| 2003/0095032 A1* | 5/2003 | Hoshino et al. | 340/5.92 |
| 2003/0112128 A1* | 6/2003 | Littlechild et al. | 340/10.52 |
| 2003/0218532 A1* | 11/2003 | Hussmann | 340/5.8 |
| 2004/0030758 A1* | 2/2004 | Cherdron et al. | 709/218 |
| 2004/0049396 A1* | 3/2004 | Hope | 705/1 |
| 2004/0069852 A1* | 4/2004 | Seppinen et al. | 235/451 |
| 2004/0085207 A1* | 5/2004 | Kreiner et al. | 340/572.1 |
| 2004/0088231 A1* | 5/2004 | Davis, Jr. | 705/28 |
| 2004/0127256 A1* | 7/2004 | Goldthwaite et al. | 455/558 |
| 2004/0164148 A1* | 8/2004 | Qiu | 235/383 |
| 2005/0040951 A1* | 2/2005 | Zalewski et al. | 340/572.1 |
| 2005/0079820 A1* | 4/2005 | Yamashita | 455/41.2 |
| 2005/0199716 A1* | 9/2005 | Shafer et al. | 235/385 |
| 2005/0205676 A1* | 9/2005 | Saito | 235/439 |

(Continued)

*Primary Examiner*—Davetta W. Goins
*Assistant Examiner*—Kerri L McNally
(74) *Attorney, Agent, or Firm*—Pearne & Gordon LLP

(57) ABSTRACT

Method for finding a lost or stolen object (1), with the following steps that must be performed before the object is lost:
said object (1) is marked with a RFID tag (10) in which an unequivocal tag identification (100) is stored,
the owner of the object (1) accesses the RFID tag (10) with a RFID reader device (2) that is built into a mobile radio telephone (3) of the owner or that is connected with this mobile radio telephone (3),
said tag identification (100) is paired with an owner identification (300) that is read from the SIM card (30) of said mobile telephone (3),
and with the following steps that are performed when said object (1) is found by a third party:
said tag identification (100) is read by a second RFID reader device (9),
the owner identification (300) that has been paired with the read tag identification (100) is determined,
said owner is informed about the finding of said object (1).

14 Claims, 3 Drawing Sheets

U.S. PATENT DOCUMENTS

| | | | |
|---|---|---|---|
| 2005/0255840 A1* | 11/2005 | Markham | 455/422.1 |
| 2005/0258241 A1* | 11/2005 | McNutt et al. | 235/385 |
| 2006/0001542 A1* | 1/2006 | Waris | 340/572.1 |
| 2006/0022030 A1* | 2/2006 | Boothroyd | 235/375 |
| 2006/0061482 A1* | 3/2006 | Monney et al. | 340/825.52 |
| 2006/0109086 A1* | 5/2006 | Amtmann | 340/10.3 |
| 2006/0144920 A1* | 7/2006 | Fang et al. | 235/375 |
| 2006/0158310 A1* | 7/2006 | Klatsmanyi et al. | 340/10.1 |
| 2006/0181393 A1* | 8/2006 | Raphaeli | 340/10.1 |
| 2006/0232398 A1* | 10/2006 | Nedblake et al. | 340/539.13 |
| 2006/0232406 A1* | 10/2006 | Filibeck | 340/572.1 |
| 2006/0267762 A1* | 11/2006 | Jedlicka et al. | 340/539.23 |

* cited by examiner

METHOD AND SYSTEM FOR FINDING LOST OR STOLEN OBJECTS

REFERENCE DATA

This application claims priority of European patent application 2004EP-104114, filed on Aug. 26, 2004, the contents of which are hereby incorporated by reference.

FIELD OF THE INVENTION

The present invention concerns a method for finding lost or stolen objects, including products, intellectual property, persons and animals, on the basis of RFID (Radio Frequency Identification) tags.

RELATED ART

Different system and methods are already known for finding objects that are not located in the expected place. Systems using transponders or RFIDs are as such already known.

Most of the known systems, however, use special RFIDs that are used only for this purpose and of which most can be used only with corresponding proprietary RFID reader devices. This has the disadvantage that only few objects, for example cars or children, are marked; for smaller or more common objects, the effort and investment is not worth it.

Furthermore, a lost object can be located only if it is in the vicinity of a suitable reader device. The possibility for finding a lost object is thus restricted because of the limited range and scant availability of the required special reader devices.

Methods and systems are also known that require a special, dedicated infrastructure, for example satellites or an antenna network, for locating lost objects in any place. The costs for such an infrastructure are very high so that such systems have been used only inside buildings and not on national or even international levels.

A tag for marking an object often functions only together with a single reader device. If a reader can read different tags, it is necessary to indicate in the tag or in a database which tags belong to which owner. This registration process, which has to be carried out by the object's seller or owner is tedious and prone to errors. There is also no universal system for identifying the owners; it is often required for the owner's complete address to be entered, which is not really worthwhile for protecting less valuable objects. If the owner moves, the address of each tag has to be changed. If the address is stored in a central database, this database must preferably be reachable worldwide, possibly in a plurality of languages, in order for a finder to easily find the owner's address. If on the other hand the address is written in the tag itself, a relatively large memory must be available in the tag, which limits the price and the usability of the tag.

BRIEF SUMMARY OF THE INVENTION

It is thus an aim of the present invention to propose a method for avoiding these disadvantages.

This aim is achieved among others with a method having the characteristics of the independent claim.

In particular, this aim is achieved with a method for finding lost or stolen objects, with the following steps that must be performed before the object is lost:

said object is marked with a RFID tag in which an unequivocal tag identification is stored, said tag identification is read with a RFID reader device that is built into a mobile radio telephone of the object's owner or that is connected with this mobile radio telephone, said tag identification is paired with an owner identification that is read from the SIM card of said mobile telephone, and with the following steps that are to be performed when said object is found by a third party:

said tag identification is read by a second RFID reader device, the owner identification that has been paired with the read tag identification is determined, said owner is informed about the finding of said object.

This has the advantage that the registration of an object occurs simply through reading a RFID tag affixed to the object and through pairing of an identification in the tag with an identification in the owner's SIM card. If the tag is read with an RFID reader device in the mobile device or connected with the mobile device, this pairing can be performed automatically by the RFID reader device.

This also has the advantage that the identification in the SIM card is universal, comprehensible and univocal.

Analogously, the identification of the user in the mobile radio network is carried out independently by the SIM card in the mobile device.

Furthermore, the inventive method can also be used with perfectly conventional RFID tags, for example EPC tags, that are used for marking objects during production and distribution. Dedicated tags are not necessary. Such common tags are cheap and can be read worldwide by a large number of RFID reader devices, including RFID reader devices that are integrated in a mobile device and that can establish a voice or data connection with the mobile device of the owner of the lost object in order to announce that the object has been found.

The method can be used without central infrastructure whilst still allowing the worldwide searching and finding of lost objects.

BRIEF DESCRIPTION OF THE DRAWINGS

The invention will be described hereinafter in more detail with the aid of the figures, in which.

DETAILED DESCRIPTION OF THE INVENTION

Figure 1:
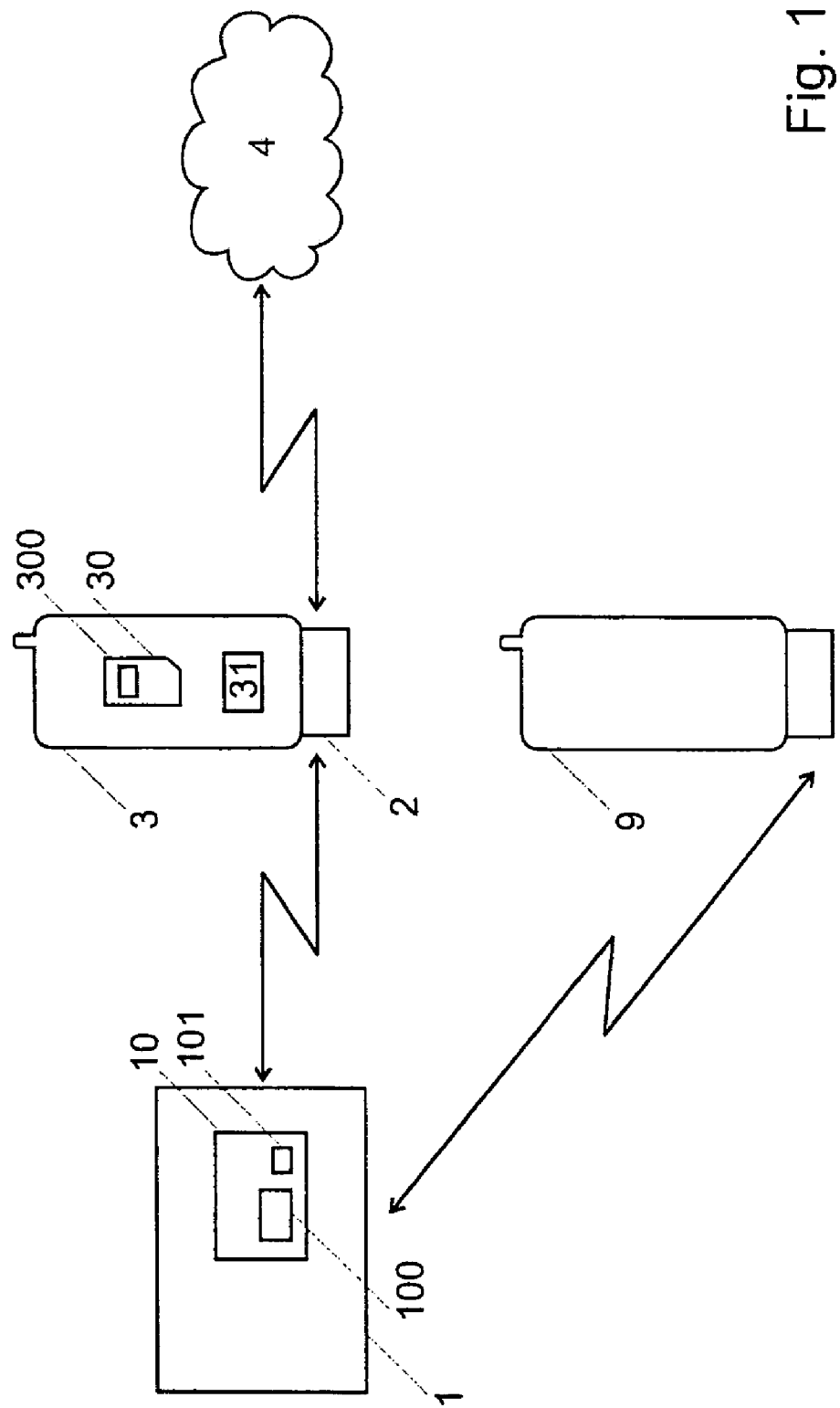
FIG. 1 shows a block diagram of a system with a mobile device, a RFID reader device and a RFID tag in which the identification, which is determined on the basis of the SIM card in the mobile device, is stored.

FIG. 1 shows the system used by a user (for example a mobile user) to mark and find objects with the inventive method. A mobile device 3 (for example a mobile radio telephone or a PDA with an interface for a cellular mobile radio network) can receive short messages (for example SMS and USSD) and data (for example IP packets) from a mobile radio network 4 and send them to this network. The mobile radio network 4 is for example a GSM, GPRS, HSCSD, EDGE, UMTS, CDMA, WLAN or Bluetooth network over which data can also be transmitted. The mobile device 3 contains an identification module (for example a SIM card 30) to identify the device through the network respectively on the network 4. One or several software applications 31 in the mobile device 3 and/or in the identification module 30 can be executed by a processor.

The mobile device 3 further includes a RFID reader/writer part 2 or is connected with such a reader/writer part (for example over a USB, Firewire, PCCard, Compactflash, proprietary or other connection or over a Bluetooth or WLAN contactless connection). The reader/writer part 2 includes a micro controller and at least one antenna or coil in order to exchange data contactlessly with RFID components (tags) 10 in a product 1 in the immediate vicinity. The data transmission preferably occurs in the frequency range of 13,56 MHz, 900 MHz and/or 860-930 MHz; other frequency ranges are however also possible. Preferably, the reader/writer part 2 can optionally work in different frequency ranges and with different RFIDs. The reach for reading the RFIDs preferably lies between a couple of centimeters to several meters (for example 10 meters)—according to the orientation of the reader/writer part and of the tag. The connection preferably occurs in half-duplex mode with an A£SK Backscatter Modulation. The tag 10 is preferably powered by the reader/writer part 2 and thus does not require its own power source.

Each tag 10 includes at least one chip and an antenna. Each chip 10 contains a permanent memory area in which an identification of the tag 100 is stored during manufacture or during personalization of the tag.

The tag identification 100 identifies univocally each particular tag 1; each tag preferably has another identification. The identification is preferably non-falsifiable.

The identifications 100 in the different tags 10 preferably include 64, 96 or more bits and are organized hierarchically. Other data can be stored in the memory area of the chip 10 and be read by the reader/writer part 2.

The chip 10 is preferably a read-only chip that can be produced cheaply and in a small size. Rewritable chips can however also be used in the frame of the invention. In particular the embodiment of the invention represented in FIG. 2 requires RFID tags with a rewritable memory area.

Tag identifications 100 are preferably distributed by a same authority to different product manufacturers, mobile radio network suppliers and value-added service providers; part of the code preferably indicates the identity of the supplier of the product 1. The product supplier reserves a series of identifications at the common authority's and stores part of these identifications in tags 10 that are then distributed with the products. A product can be provided by several organizations with different tags. The tags are preferably EPC (Electronic Product Codes) that are promoted by the EPC Global Organization and that are intended especially for marking industrial objects during production and distribution. The tag 10 is usually affixed by the product manufacturer onto the product 1.

At least one application 31 that is loaded over the mobile radio network into the mobile device 3 or into the SIM card 30, for example an Applet, can be provided in the mobile device 3 and/or in the SIM card 30 to read tag identifications in neighboring tags over the reader/writer part 3 and to pair them with identifications from the SIM card, as will be described later. This pairing can however also be carried out by other devices. Through the linking of the tag identification 100 with an identification 300 from the SIM card 30 and a storing of the pair in a memory area in the tag 10 or in a remote server 6, the owner of the object 1 is made known.

The identification 300 from the SIM card 30 that is used for univocally identifying the user of the object 1 can preferably be the MSISDN or IMSI identification that is already available in a GSM system, or another equivalent identification (IP or MAC) in another mobile radio network system and/or an ad hoc identification dedicated to this purpose. It is also possible that the complete electronic or postal address of the owner can be extracted on the basis of the SIM card 30.

The reading of a tag identification 100 from a tag 10 is preferably initiated by the mobile device 3; it is for example possible that the mobile device 3 searches continuously or periodically for neighboring tags 10 and reads and processes or forwards identifications 100 in found tags. In another, power saving variant embodiment, the reading is initiated by the user of the mobile device 3 who starts a corresponding application 31 or enters a command if he wants to read a tag. The reading of the tag in the mobile device 3 or with another device 3 can also be initiated by an external device (for example a sales point or an automatic vending machine) over an interface at close range (for example Bluetooth or WLAN) over the mobile radio network 4 or over a link on a visited WEB or WAP page.

According to the application 31, a password or another authentication can also be requested before a pairing between a tag identification 100 and an identification 300 from the SIM card 30 takes place. The password is for example communicated by the seller of the object to the new user and is needed for reading the tag identification 100, for reading the SIM identification 300 from the tag 10 and/or for writing the pairing in the suitable memory area. In this manner it can be ensured that only authorized users of the user 1 can take this object.

Security is further ensured through the closeness required between the mobile device 3 and the tag 10 during the registration process. Only a user that finds himself within the reach of the RFID tag 10 can take the marked object.

In the embodiment of FIG. 1, the pairing between the tag identification 100 and the owner identification 300 from the SIM card 30 is stored in the tag 10. For this purpose, the owner who can appropriate the object 1, writes his identification in a suitable rewritable memory area of the tag with the aid of an application 31 and of the RFID reader device 2. The writing process preferably takes place only after a description of the object read from the tag 10 has been transmitted to the mobile device 3 and shown to the owner; in this manner it is possible to ensure that the owner does not unknowingly appropriate another marked object.

In order to prevent that a user appropriates an object 1 that is not his own, it is possible in a preferred embodiment to require an electronic key in order to make possible or store the pairing. The key can for example depend on the tag 10 and be communicated to the user by the seller of the marked object or by another authority that can authenticate the property rights of the object 1.

In another variant embodiment, the pairing is performed or stored by the seller of the marked object 1 or by another authority that can authenticate the property rights of the object.

It is also possible that an already registered pairing is deleted or replaced by an authority that can authenticate the property rights of the object, this process being also remotely controllable over the mobile radio network 4.

Figure 2:
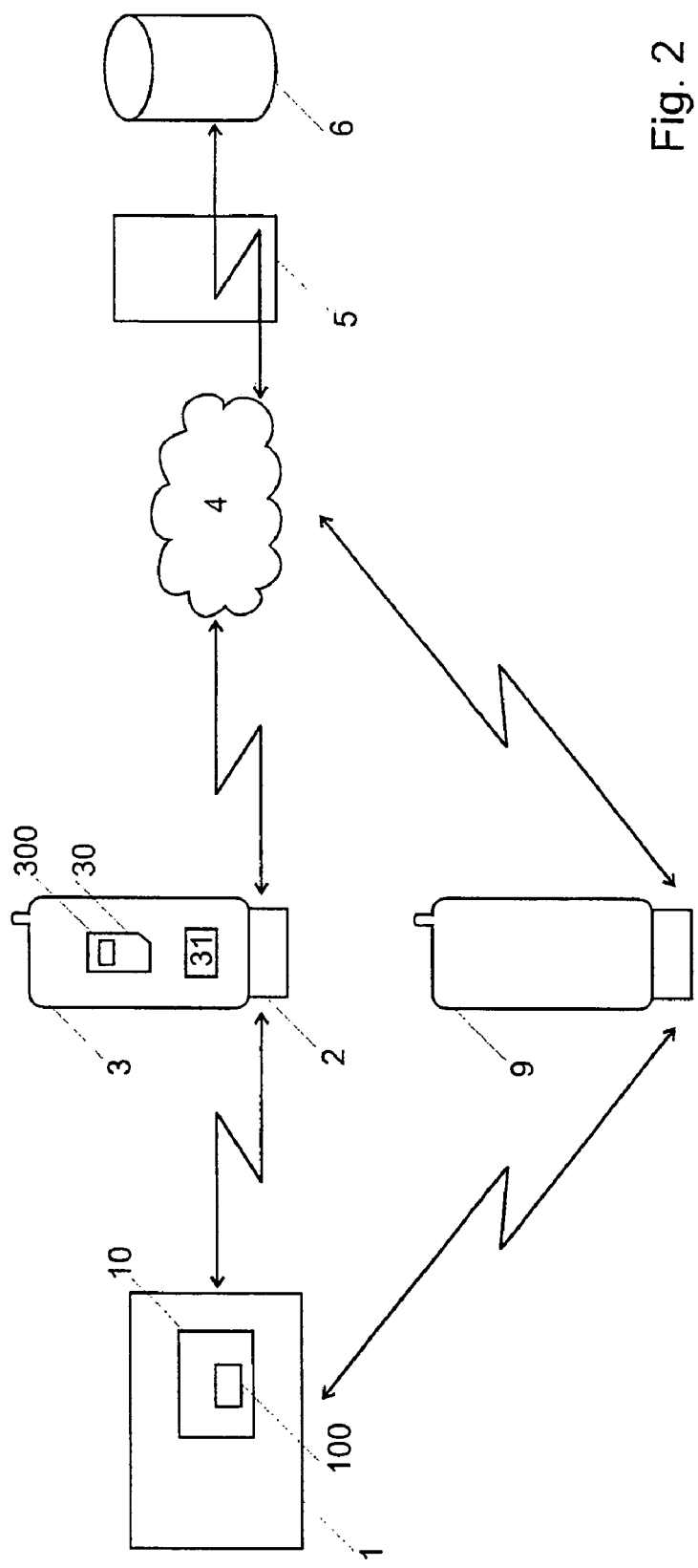
FIG. 2 shows a block diagram of a system with a mobile device, a RFID reader device and a central database in which the identification from the SIM card is linked with the identification of the tag.

In the embodiment of FIG. 2, the pairing between the tag identification 100 and the owner identification 300 from the SIM card 30 is stored in a central database 6. The database is operated by a service provider that possibly bills this service, and contains a list of tag identifications and corresponding owner identifications.

In the represented embodiment of FIG. 2, the owner identifications 300 are replaced in an anonymizer 5 with permanent alias, in order to guarantee the anonymity of the object's owner. Only the anonymizer knows the link between the alias and the owner identifications.

The registration process through which the pairing is stored in the database 6 begins with the reading of the tag identification 300 from the tag 30 through the mobile device 3. This identification is linked with the owner identification from the SIM card 30 and packed in a data message that is sent to the database 6. In a preferred embodiment, the transmission of the pair occurs over short messages that are billed higher in favor of the service provider of the server, for example SMS. A transmission for example over e-mails sent by the mobile device, over the WEB or WAP is also possible. A transmission of the tag identification 300 and of the owner identification to a computer of the owner (not represented), for example over Bluetooth, USB or IrdA, and the sending of the pair to the database by an appropriate application in the computer are also possible.

In an embodiment, the database 6 can request an authentication of the server, for example over passwords, biometric methods or on the basis of the cryptographic signing means in the SIM card or in the mobile device 3. In this manner, it can be ensured that the message has indeed been sent by the owner in question. In this manner, it is possible to reduce the risk that a third party illicitly appropriates an object. It is however also possible that the authentication is ensured merely by receiving the identification from the SIM card.

Figure 3:
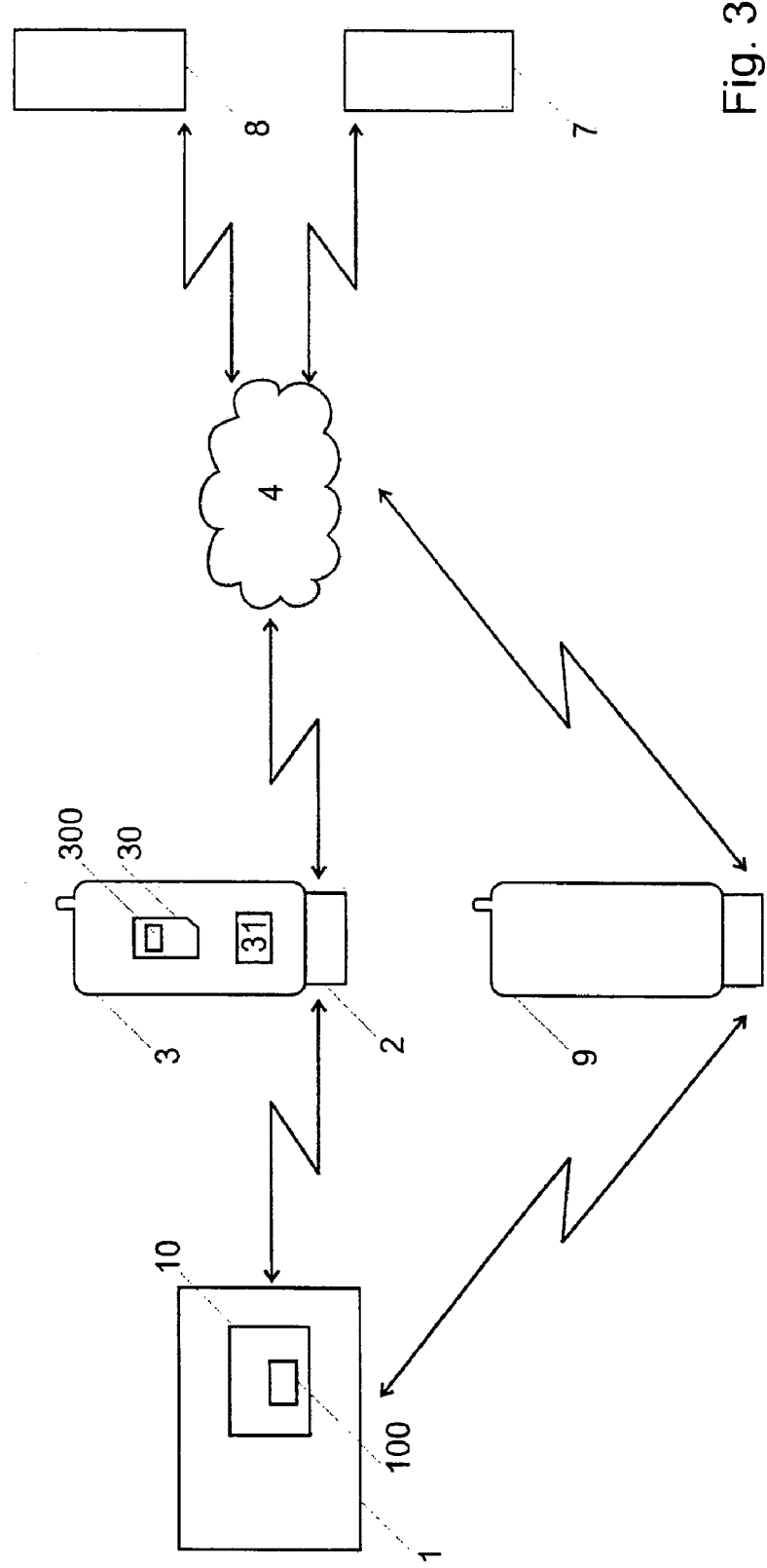
FIG. 3 shows a block diagram of a system with a mobile device, a RFID reader device and Hypertext pages in which the identification from the SIM card is linked with the identification of the tag.

In the embodiment of FIG. 3, the pairing between the tag identification 100 and the owner identification 300 from the SIM card 30 is stored in a page in a server 7. The server 7 is connected over internet or an intranet with a name service server 8, in which for each tag identification a corresponding electronic address of an electronic Hypertext page is stored.

A reader or writer request with a tag identification 100 is forwarded from the server 7 to the name service server 8 that answers with the corresponding electronic address of the page that corresponds with the tag identification. The electronic address consists for example of an URL or another address for a TCP-IP network.

The page in the server 7 that corresponds to the tag identification includes an owner identification 300 from the SIM card 30 or at least an alias, on the basis of which an anonymizer (not represented) can determine this owner identification.

The name service server 8 can be managed by the operator of the server 7 and/or by external entities (for example by the organization that distributes the codes 100 to the different companies). Several name service servers can be connected with one another, so that the desired address is sought in another name service server if it is not in the server 8. This allows for example a mobile radio network operator to process codes of other organizations. A local cache of an external name service can also be provided in the server 7 or in the domain of the server 7; this cache can for example contain only the addresses that correspond to the codes that are in the value cards of the mobile radio network operator.

A RFID reader device reading a tag identification 100 can thus always send this identification to the address that corresponds to the tag identification in the name service server 8. The processing of the message thus depends only on the tag identification in the message. The same messages that reach different service providers can thus cause exactly the supplying of the same service or information.

The linking in the name service server 8 between a tag identification and an address can preferably be modified at any time (for example by the object's owner, for example over a dedicated WEB form). This makes it possible to modify the electronic address of a page or of a domain without having to inform the tag users.

The page in the server 7 possibly comprises a Hypertext content in a Markup language. The content of the page is completed with the identification 300 of the owner or with an alias if the owner has appropriated an object 1 and has sent a corresponding message (for example a SMS, MMS, e-mail or over a WEB form) to the page corresponding to the tag identification.

In a variant embodiment, this page includes an XML content (extended Markup Language). In another variant, the page includes a PML content (Product Marking Language). The page can also support SOAP protocol (Simple Object Access Protocol), .NET-Framework or other WEB services with which the mobile device 3 can access services and objects of the server 7. In this case, the inventive method includes the supplying of executable program code elements or SOAP- and/or .NET services.

The RFID reader device 3 downloads the desired page from the server 7 and/or accesses the desired service (or the object at the indicated address), in order to communicated the identification of the owner of the marked object 1 to the user of the reader device. The user can reproduce the desired information for example with a normal browser.

In all embodiments, the registration process is preferably launched by the owner of the object, by storing an identification 300 in the tag 10 (FIG. 1) or by reading the tag identification 100 from the tag 10, by linking it with the identification from the SIM card and by transmitting it to a remote memory area 7 (FIG. 2, 3). It would however also be possible to have a registration process that is triggered automatically by the mobile device 2, 3 each time a marked object without owner, or an object marked as lost, is found, or a registration that is triggered by a third party, for example by the seller of the object 1. In the latter case, the registrating third party must also access the identification 300 in the SIM card, for example over a Bluetooth interface or by sending a short message to the mobile device 3 requesting an answer.

As already mentioned, a key can be requested by the tag and/or by the application 31 in order for the registration process to occur, with the key being dependent on the tag and distributed by an authority that can verify the property rights of the object.

The pairing stored in the tag 10, in the database 6 or on the PML page 7 can in all variant embodiments be signed electronically and possibly be provided with a time stamp. In this manner it is possible to ensure that the pairing cannot be changed and in particular that the identification 300 of the owner is not replaced. If the ownership of the object is changed, all successive owners are preferably stored. In this manner, it is possible to find also previous owners of an object.

During the registration process, the tag identification is automatically copied in the mobile device 3 or in a computer connected with this mobile device in order for the owner to remember this identification also after a possible loss of the object. The identification can possibly be signed electronically and provided with a time stamp, and can thus serve as proof of property.

We will now describe the process following the registration process.

In a first embodiment, the application 31 searches periodically, or manually upon the user's initiative, for registered objects. For this purpose, requests are sent to the tag 10 that wake up the tag and should provoke an answer. If no answer is received, it can be assumed that the object has been lost or is located outside the reach of the reader device 2. The mobile device can in such a case try once more to find the tag, for example only after a certain time or with a greater transmitting power. If the tag 10 remains unreachable, the marked object is considered to be probably lost. This state can be communicated to the owner through a visual signal or through a sound signal of the mobile device 2, 3. It is also possible that other mobile users are informed automatically or after confirmation of the owner about the loss, for example by a message being sent in broadcast mode at least in the geographical area where the tag is located and/or by the database 6 respectively the PML page in the server 7 that corresponds to the tag identification being complemented with an indication of the loss. Mobile users that find the object can read the tag identification with their mobile device, access the database 6 respectively the PML page 7, find out that the object is considered lost and get into contact with the owner.

In a second embodiment, the mobile device 2, 3 periodically writes a time mark in the tag 10 if it can connect with this tag. If the marked object is found by a third party with a second mobile radio device 9, it can be determined on the basis of the age of the last time mark whether the object has been away from its owner for a long period of time. It is also possible that the location is periodically recorded in order to determine where the owner connected himself for the last time with the object.

In a third embodiment, each third party 9 that automatically or manually initiates a connection with the tag 10, asks whether the tag 10 is registered and whether it is still in contact with its owner. The tag is awakened by the request and attempts to build a connection with the RFID reader device 3 of the owner. If this attempt fails, the tag reports itself as lost.

If the loss of an object is noticed by the owner, by a third party 9 or by the tag itself, this loss can be notified according to the connection possibilities in the database 6, on the corresponding PML page in the server 7 and/or in the tag 10. In this manner, a third party 9 that finds the tag, and/or the owner himself, can find out that the object 1 is considered lost. It is also possible that the loss is announced to a community of mobile users over data messages sent in broadcast mode at least in a limited geographical area around the place of the loss. In this respect, the sending of the broadcast message can be initiated by the mobile device of the owner or by a central server, for example the server in which the database 6 is hosted.

In a preferred embodiment, the owner can promise a reward and announce when the loss of an object was noticed. The reward, including the type, amount and modalities, can be announced in the database 6 respectively on the PML page 7 corresponding to the tag identification. The reward can for example be sent over appropriate text messages to a predetermined address or preferably over WEB or WAP forms from the mobile device 3 or from another internet terminal.

If a lost or stolen object is found by a third party 9, it is first necessary to ascertain that the object has lost its owner. For certain objects (including persons, children and animals) and situations, this state can clearly be detected. For other objects (e.g. stolen cars on a parking space), this fact can be determined in that the tag 10 or the field in the database 6 respectively the PML page 7 corresponding to the tag identification contain a notice of loss.

In an embodiment, at least certain RFID reader devices 3 continuously or regularly scan for RFID tags 10 in the vicinity to determine whether these objects are lost. Users can be persuaded to switch on this search mode as often as possible, for example by having the search or at least the finding or restitution of found objects made financially attractive. It is also possible that the permanent and regular search for lost objects is required in order to be able oneself to register objects.

After the finding third party 9 has ascertained that a found object is considered by its owner to be lost, the electronic or postal address of this owner must be found. In the easiest case, the owner identification was stored in the tag 10; this case, the third party 9 can simply read this identification and contact the owner. In the tag 10, the MSISDN number of the owner can be available; the third party 9 can simply use this number to build a telephonic data or voice connection with the owner. This process can occur manually, in that the third party himself initiates the reading of the tag and the establishment of a connection, or also fully automatically, possible without the third party noticing it. In this case, it can be automatically determined that a read tag 10 marks a lost object 1, the MSISDN number of the owner is automatically read by an application 312 in the mobile device 3 and a data message, for example a SMS or e-mail, is automatically prepared and send to the owner automatically or after confirmation of the third party.

The reading of the MSISDN number from the tag 10 requires however tags with rewritable memory areas. If no owner identification has been written directly in the tag 10, this identification can be retrieved according to the embodiments of FIGS. 2 and 3 from the database 6 respectively from the PML page 7 corresponding to the tag identification.

If the owner identification in one of the three embodiments has been replaced by an alias, the finding third party 9 cannot build a direction connection with this owner but only over the anonymizer 5 that knows the link between each alias and each owner identification.

The finding third party 9 can also record in the database 6 respectively on the PML page 7 that the lost object has been found. This entry can be triggered manually or automatically.

In order to avoid that the finding third party 9 bears the costs for notifying the owner, messages are preferably used that cause no costs for the sender. In a variant, e-mails are sent. In a second variant, USSD are sent. It is also possible that a call-back voice call is established with the owner of the found object. As a variant embodiment, the relatively short message about finding the object 1 can also be hidden in another data message of the third party and be separated from it automatically within the mobile radio network. In yet another embodiment, SMS or other data messages are used that can be billed expensively to the receiver in favor of the sender.

In a variant embodiment, no direct message from the finding third party is sent to the object's owner. Instead, the finding of the object is notified to the owner indirectly, for example over the database 6, over the PML page 7 or over an intermediary station informed by the third party. In this manner, the anonymity of the third party can be secured at least temporarily, for example until the object 1 is returned or until the reward is credited.

After the marked object has been found again and the owner has been notified thereof, the restitution of the object must be organized. This can be organized directly between the owner and the finding third party 9 if both parties have contacted each other. It is also possible that the found object is first send to an intermediary station, which can for example be managed by the operator of the database 6, and from there be forwarded to the legitimate owner. The intermediary station can also cause the payment of the reward to the finding third party 9 and the corresponding debiting of a money account of the owner; in this respect, fees in favor of the intermediary station can also be billed. The payment of the reward and the billing to the owner can happen for example over a money account of the SIM card, in particular if the intermediary station is managed by the mobile radio network operator. The intermediary station can also perform tests to verify whether the object 1 really belongs to the registered owner. It is for example possible to verify whether the SIM card paired with the object has not itself been announced as lost or stolen.

An anonymous restitution of the object and the payment of the reward can also be arranged by the intermediary station.

The payment of the reward can also occur over a blocked money account that is loaded by the owner after having noticed the loss or at the latest after being notified that the object has been found and that is debited only after restitution of the object in favor of the finding third party.

The invention claimed is:

1. Method for finding a lost or stolen object of an owner, said method comprising the steps of:
    before the object is lost, performing the steps of:
        providing a mobile device comprising a first RFID reader device to the owner;
        providing an identification module in communication with said mobile device, said identification module for storing owner identification information of the owner;
        marking said object with a RFID tag in which an unequivocal tag identification is stored,
        the owner of the object using said mobile device for accessing the RFID tag with the first RFID reader device of said mobile device,
        said mobile device reading the owner identification information from said identification module;
        said mobile device pairing said tag identification with the owner identification information for storing in a database,
    and when said object is found by a third party, performing the steps of:
        reading said tag identification by a second RFID reader device different than said first RFID device,
        determining the owner identification that has been paired with the read tag identification in said database, and
        informing said owner about the finding of said lost or stolen object.

2. The method of claim 1, wherein the pairing of the tag identification with the owner identification is triggered by said owner.

3. The method of claim 1, wherein the pairing of the tag identification with the owner identification is recorded in said database that is a central database in which pairings of different owners are recorded.

4. The method of claim 1, wherein an electronic key is requested for pairing the tag identification with the owner identification.

5. The method of claim 1, wherein said owner identification is replaced with an alias, said second RFID reader device determining only said alias, said alias being replaced with the corresponding owner identification by a module in order to inform said owner about the finding of the object.

6. The method of claim 1, wherein a connection is automatically built between said first RFID reader device and said tag and wherein the tag is considered lost if the connection cannot be established.

7. The method of claim 1, further comprising the step of periodically writing a time mark in said tag.

8. The method of claim 1, wherein the loss of the object is recorded with the aid of the mobile device of the owner in said database that is a central database.

9. The method of claim 1, wherein the loss of an object is announced on a Hypertext page corresponding to the tag identification.

10. The method of claim 1, wherein a reward for the finder of said object is offered, the finder of the object being able to check the offered reward on the basis of said tag identification.

11. The method of claim 1, wherein said tag identification is in EPC format.

12. A system for finding a lost or stolen objects of the respective owners, said system comprising:
    a plurality of objects that are each marked with RFID tags in each of which unique tag identifications are stored,
    a plurality of RFID reader devices for reading said RFID tags,
    mobile radio devices that are each connected with said RFID reader devices and that log into a mobile radio network, wherein each mobile radio device includes an identification module in which a mobile user identification for identifying one of said owners is stored, and
    at least one storage medium for storing a plurality of Hypertext pages, each one of said Hypertext pages corresponding to one of said tag identifications and being capable of being determined on the basis of this said tag identification, and said mobile user identification being associated with said Hypertext pages for identifying the corresponding owner of each one of the objects.

13. A system for finding a lost or stolen object of an owner, said system comprising:
    means for preparing said object to be found prior to being lost or stolen, said means for preparing including:
        means for marking said object with a RFID tag in which an unequivocal tag identification is stored,
        a mobile device including:
            an identification module for storing owner identification information, and
            a first RFID reader device for the owner of the object to access the RFID tag,
        means for pairing said tag identification with said owner identification information, and
        means for transmitting said paired tag identification with said owner identification to a remote database for storage,
    a second RFID reader device different from said first RFID reader device for reading said tag identification,
    means for accessing said database for determining the owner identification information that has been paired with the read tag identification, and
    means for informing said owner about the finding of said lost or stolen object.

14. The system of claim 13, said system further comprising a storage device for storing at least one hypertext page, wherein said means for pairing utilizes said at least one hypertext page made corresponding to one said tag identifications and made associated with said owner identification.

* * * * *